(12) United States Patent
Zhan

(10) Patent No.: US 9,402,190 B2
(45) Date of Patent: *Jul. 26, 2016

(54) APPARATUS AND METHODS FOR RADIO FREQUENCY SIGNAL BOOSTERS

(71) Applicant: CELLPHONE-MATE, INC., Fremont, CA (US)

(72) Inventor: Hongtao Zhan, Fremont, CA (US)

(73) Assignee: CELLPHONE-MATE, INC., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/996,681

(22) Filed: Jan. 15, 2016

(65) Prior Publication Data

US 2016/0135059 A1    May 12, 2016

Related U.S. Application Data

(63) Continuation of application No. 14/811,650, filed on Jul. 28, 2015, which is a continuation of application No. 14/493,260, filed on Sep. 22, 2014, now Pat. No. 9,100,839, which is a continuation of application No. 13/872,877, filed on Apr. 29, 2013, now Pat. No. 8,867,572.

(51) Int. Cl.
*H04J 1/02*     (2006.01)
*H04W 16/26*    (2009.01)
(Continued)

(52) U.S. Cl.
CPC ........... *H04W 16/26* (2013.01); *H04B 7/15507* (2013.01); *H04B 7/15542* (2013.01); *H04B 1/40* (2013.01); *H04W 52/18* (2013.01)

(58) Field of Classification Search
CPC .............. H04B 1/26; H04B 1/30; H04B 1/40; H04B 7/15507; H04B 7/15542; H04H 20/26; H04H 40/18; H04L 27/368; H04W 16/26; H04W 24/02; H04W 52/04; H04W 52/18; H04W 52/38
USPC ................. 370/464, 480, 481, 482, 492, 497; 375/295, 296, 297; 455/130, 150.1, 455/154.1
See application file for complete search history.

(56) References Cited

U.S. PATENT DOCUMENTS 5,095,528 A   3/1992  Leslie et al.
5,208,563 A   5/1993  Russell et al.
(Continued)

OTHER PUBLICATIONS

Representative FCC Approval Documents for Product Code CM5000, made public Apr. 30, 2012, in 47 pages (available at World Wide Web page: transition.fcc.gov/oet/ea/fccid/).
(Continued)

*Primary Examiner* — Khoa Huynh
(74) *Attorney, Agent, or Firm* — Knobbe Martens Olson & Bear LLP

(57) ABSTRACT

Provided herein are apparatus and methods for radio frequency (RF) signal boosters. In certain implementations, a multi-band signal booster is provided for boosting the uplink and downlink channels of at least a first frequency band and a second frequency band. In certain configurations, the downlink channels of the first and second channels are adjacent, and the signal booster includes a first amplification path for boosting the uplink channel of the first frequency band, a second amplification path for boosting the uplink channel of the second frequency band, and a third amplification path for boosting both downlink channels of the first and second frequency bands.

30 Claims, 8 Drawing Sheets

(51) Int. Cl.
  *H04B 7/155* (2006.01)
  *H04B 1/40* (2015.01)
  *H04W 52/18* (2009.01)

(56) References Cited

U.S. PATENT DOCUMENTS

| | | | |
|---|---|---|---|
| 5,815,795 | A | 9/1998 | Iwai |
| 6,570,858 | B1 | 5/2003 | Emmons et al. |
| 6,748,194 | B2 | 6/2004 | Oh et al. |
| 7,250,830 | B2 | 7/2007 | Layne et al. |
| 7,706,744 | B2 | 4/2010 | Rodgers et al. |
| 7,729,656 | B2 | 6/2010 | Van Buren |
| 7,783,318 | B2 | 8/2010 | Wilson et al. |
| 8,755,399 | B1 | 6/2014 | Van Buren et al. |
| 8,760,241 | B1 | 6/2014 | Ashworth et al. |
| 8,803,635 | B1 | 8/2014 | Ashworth et al. |
| 8,867,572 | B1 | 10/2014 | Zhan |
| 9,100,839 | B2 | 8/2015 | Zhan |
| 2005/0227652 | A1* | 10/2005 | Kang ............... H04B 1/28 455/194.2 |
| 2007/0071128 | A1 | 3/2007 | Meir et al. |
| 2008/0186106 | A1 | 8/2008 | Christian et al. |
| 2008/0233865 | A1* | 9/2008 | Malarky ............ H04B 7/18515 455/12.1 |
| 2011/0261727 | A1 | 10/2011 | Han |
| 2012/0302188 | A1* | 11/2012 | Sahota ............... H04B 1/006 455/150.1 |
| 2014/0292593 | A1 | 10/2014 | Thiam et al. |

OTHER PUBLICATIONS

Cellphone-Mate Force-5 Manual, Apr. 30, 2012, in 36 pages (available at World Wide Web page: transition.fcc.gov/oet/ea/fccid/).
Cellphone-Mate SureCall Press Release, dated Apr. 30, 2012, in 2 pages (available at World Wide Web page cellphone-mate.com/newp/FORCE5.html on Apr. 30, 2012).
Wilson Sleek 4G Signal Booster Installation Guide, Dec. 4, 2012, in 8 pages (available at World Wide Web page wilsonelectronics.com).
Wilson AG ProTM Quint Selectable Signal Booster Installation Guide, Sep. 12, 2012 in 16 pages (available at World Wide Web page wilsonelectronics.com).

* cited by examiner

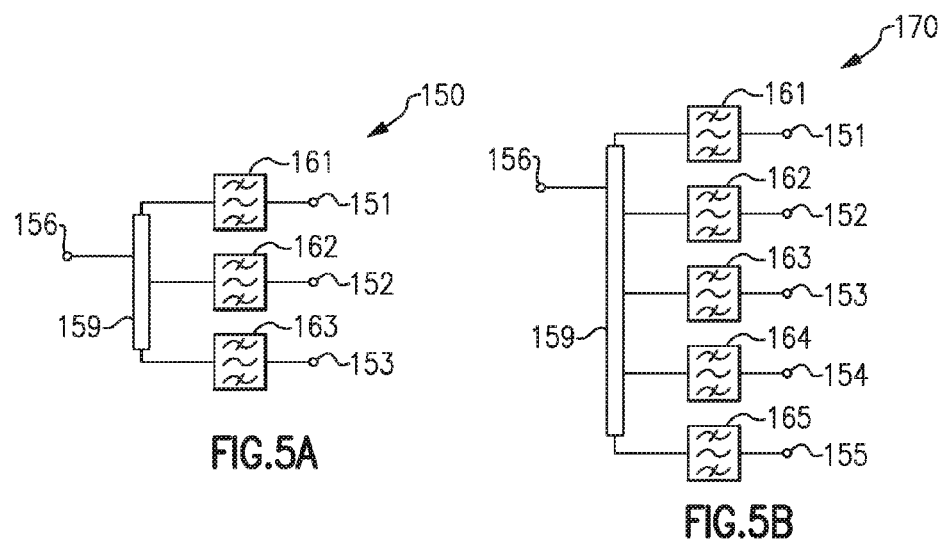
FIG.5A
FIG.5B
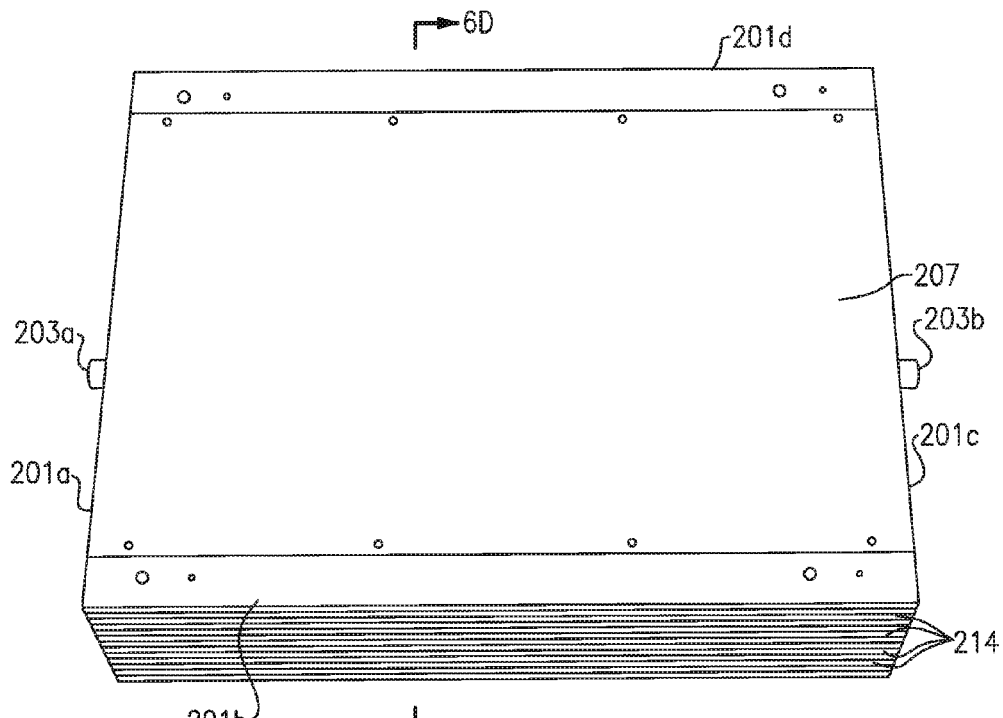
FIG.6A

US 9,402,190 B2

APPARATUS AND METHODS FOR RADIO FREQUENCY SIGNAL BOOSTERS

CROSS-REFERENCE TO RELATED APPLICATIONS

This application is a continuation of U.S. patent application Ser. No. 14/811,650, filed Jul. 28, 2015, titled "APPARATUS AND METHODS FOR RADIO FREQUENCY SIGNAL BOOSTERS," which is a continuation of U.S. patent application Ser. No. 14/493,260, filed Sep. 22, 2014, titled "APPARATUS AND METHODS FOR RADIO FREQUENCY SIGNAL BOOSTERS," now U.S. Pat. No. 9,100,839, issued Aug. 4, 2015, which is a continuation of U.S. patent application Ser. No. 13/872,877, filed Apr. 29, 2013, titled "APPARATUS AND METHODS FOR RADIO FREQUENCY SIGNAL BOOSTERS," now U.S. Pat. No. 8,867,572, issued Oct. 21, 2014, each of which are herein incorporated by reference in their entireties.

BACKGROUND

1. Field

Embodiments of the invention relate to electronic systems and, in particular, to radio frequency (RF) signal boosters.

2. Description of the Related Technology

A cellular or mobile network can include base stations for communicating with wireless devices located within the network's cells. For example, the base stations can transmit signals to wireless devices via a downlink channel and can receive signals from the wireless devices via an uplink channel. In the case of a network operating using frequency division duplexing (FDD), the downlink and uplink channels are separate in the frequency domain such that the frequency band operates using a pair of frequency channels.

A wireless device may be unable to communicate with any of the base stations when located in a portion of the mobile network having poor or weak signal strength. For example, the wireless device may be unable to communicate with a particular base station when the wireless device and the base station are separated by a large distance. Additionally, structures such as buildings or mountains can interfere with the transmission and/or reception of signals sent between the wireless device and a base station.

To improve the network's signal strength and/or the network's coverage, a radio frequency (RF) signal booster or repeater can be used to amplify signals in the network. For example, the signal booster can be used to amplify or boost signals having frequencies associated with the frequency ranges of the network's uplink and downlink channels. In certain configurations, a signal booster can be used to provide network coverage inside of a structure, such as a home or building. However, other configurations are possible, such as implementations in which the signal booster is used to provide coverage to remote network areas or in which the signal booster is coupled to a vehicle such as an automobile, bus, or train and used to boost network signals as the vehicle's position changes over time.

SUMMARY

In one embodiment, a radio frequency signal booster includes a first amplification path, a second amplification path, and a third amplification path. The first amplification path includes a first band-pass filter configured to pass a first channel of a first frequency band and to attenuate a second channel of the first frequency band. The first channel has a first channel type and the second channel has a second channel type. Additionally, the first channel type comprises one of an uplink channel or a downlink channel, and the second channel type comprises the other of the uplink channel and the downlink channel. The second amplification path includes a second band-pass filter configured to pass a first channel of a second frequency band and to attenuate a second channel of the second frequency band. The first channel of the second frequency band has the first channel type, and the second channel of the second frequency band has the second channel type. The third amplification path includes a third band-pass filter configured to pass both the second channel of the first frequency band and the second channel of the second frequency band. The third band-pass filter is further configured to attenuate both the first channel of the first frequency band and the first channel of the second frequency band.

In another embodiment, a multiplexer includes an antenna terminal, a first terminal, a second terminal, a third terminal, a first band-pass filter, a second band-pass filter, and a third band-pass filter. The first band-pass filter is electrically connected between the first terminal and the antenna terminal. Additionally, the first band-pass filter is configured to pass a first channel of a first frequency band and to attenuate a second channel of the first frequency band. The first channel has a first channel type and the second channel has a second channel type. The first channel type comprises one of an uplink channel or a downlink channel, and the second channel type comprises the other of the uplink channel and the downlink channel. The second band-pass filter is electrically connected between the second terminal and the antenna terminal. The second band-pass filter is configured to pass a first channel of a second frequency band and to attenuate a second channel of the second frequency band. The first channel of the second frequency band has the first channel type, and the second channel of the second frequency band has the second channel type. The third band-pass filter is electrically connected between the third terminal and the antenna terminal. The third band-pass filter is configured to pass both the second channel of the first frequency band and the second channel of the second frequency band. The third band-pass filter is further configured to attenuate both the first channel of the first frequency band and the first channel of the second frequency band.

In another embodiment, a method of radio frequency signal boosting is provided. The method includes passing a first channel of a first frequency band using a first band-pass filter and attenuating a second channel of the first frequency band using the first band-pass filter. The first channel has a first channel type and the second channel has a second channel type. The first channel type comprises one of an uplink channel or a downlink channel, and the second channel type comprises the other of the uplink channel and the downlink channel. The method further includes passing a first channel of a second frequency band using a second band-pass filter, and attenuating a second channel of the second frequency band using the second band-pass filter. The first channel of the second frequency band has the first channel type, and the second channel of the second frequency band has the second channel type. The method further includes passing both the second channel of the first frequency band and the second channel of the second frequency band using a third band-pass filter, and attenuating both the first channel of the first frequency band and the first channel of the second frequency band using the third band-pass filter.

In another embodiment, a radio frequency signal booster includes a housing, a first printed circuit board (PCB) positioned within a first cavity of the housing, a second PCB positioned within a second cavity of the housing, and a shielding structure positioned between the first PCB and the second PCB. The first PCB includes a first plurality of amplification paths configured to boost a first plurality of radio frequency bands, and the first plurality of radio frequency bands each have a frequency less than about 1 GHz. The second PCB includes a second plurality of amplification paths configured to boost a second plurality of radio frequency bands, and the second plurality of radio frequency bands each have a frequency greater than about 1 GHz.

BRIEF DESCRIPTION OF THE DRAWINGS

FIG. 5A is a schematic diagram of a multiplexer according to one embodiment.

FIG. 5B is a schematic diagram of a multiplexer according to another embodiment.

FIG. 6A is a perspective view of a signal booster in accordance with one embodiment.

DETAILED DESCRIPTION OF EMBODIMENTS

Figure 1:
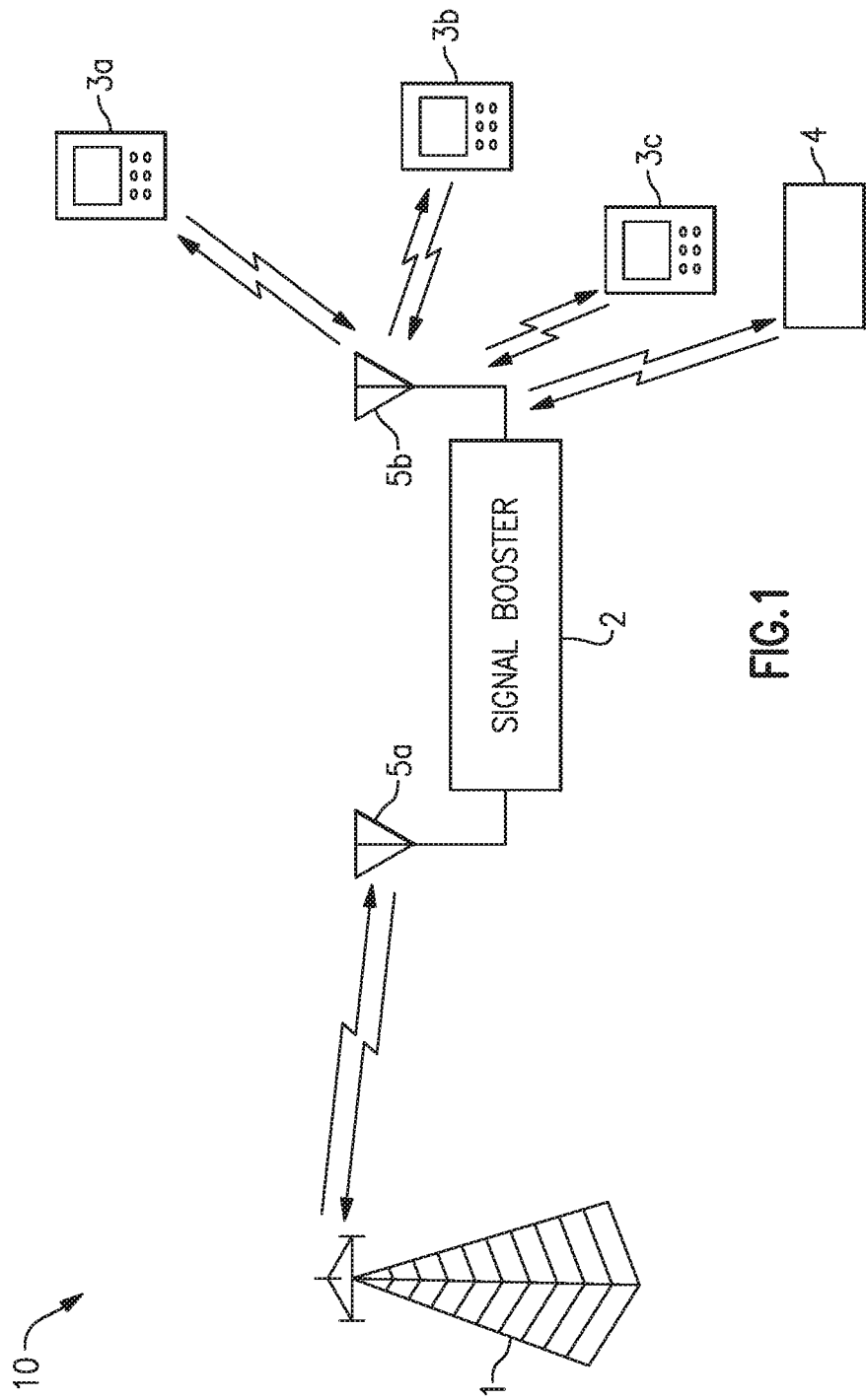
FIG. 1 is a schematic block diagram of one example of a mobile network.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

FIG. 1 is a schematic block diagram of one example of a mobile network 10. The mobile network 10 includes a base station 1, a signal booster 2, a plurality of mobile devices 3a-3c (three shown), and a network device 4.

The signal booster 2 is electrically coupled to a first antenna 5a and to a second antenna 5b. The signal booster 2 can retransmit signals to and receive signals from the base station 1 using the first antenna 5a, and can retransmit signals to and receive signals from the plurality of mobile devices 3a-3c and/or the network device 4 using the second antenna 5b. For example, the signal booster 2 can retransmit signals to the base station 1 over one or more uplink channels, and can receive signals from the base station 1 over one or more downlink channels. Additionally, the signal booster 2 can retransmit signals to the plurality of mobiles devices 3a-3c and/or the network device 4 over one or more downlink channels, and can receive signals from the devices over one or more uplink channels. In one embodiment, the first antenna 5a is an outdoor antenna positioned external to a structure such as a home or building and the second antenna 5a is an indoor antenna positioned within the structure. However, other configurations are possible. In the illustrated configuration, the first and second antennas 5a, 5b can be external to the signal booster 2, and can be connected, using, for example, cables. However, other configurations are possible, including, for example, configurations in which the antennas are integrated as part of a signal booster. While illustrated with a common housing for boosting all frequency bands of interest, the teachings herein are applicable to configurations in which the signal booster 2 is implemented in multiples boxes or housings that communicate with one another, such as over a wireless communication channel at different frequency than the frequency bands the signal booster 2 boosts.

Although FIG. 1 illustrates the signal booster 2 as communicating with one base station, the signal booster 2 typically communicates with multiple base stations. For example, the signal booster 2 can be used to communicate with base stations associated with different cells of a network. Furthermore, in certain implementations, the signal booster 2 can communicate with base stations associated with different networks, including, for example, networks associated with different wireless carriers and/or networks associated with different RF frequencies or bands.

For example, the mobile devices 3a-3c and/or the network device 4 can communicate at least in part over multiple frequency bands, including, for example, Universal Mobile Telecommunications System (UMTS) Band II, Band IV, Band V, Band XII, and/or Band XIII. For instance, in one example, the first mobile device 3a can operate using Advanced Wireless Services (AWS) (Band IV), the second mobile device 3b can operate using Personal Communication Services (PCS) (Band II), and the third mobile device 3c can operate using Cellular (CLR) services (Band V). Furthermore, in certain configurations, all or a subset of the mobile devices 3a-3c and/or the network device 4 can communicate using Long Term Evolution (LTE), and may transmit and receive Band XII signals, Band XIII signals, and/or signals associated with other LTE bands. Although specific examples of frequency bands and communication technologies have been described above, the teachings herein are applicable to a wide range of frequency bands and communications standards.

Accordingly, the signal booster 2 can be configured to boost signals associated with multiple frequency bands so as to improve network reception for each of the mobile devices 3a-3c and the network device 4. Configuring the signal booster 2 to service multiple frequency bands can improve network signal strength for multiple devices. For example, the signal booster 2 can improve network signal strength of devices using the same or different frequency bands, the same or different wireless carriers, and/or the same or different wireless technologies. Configuring the signal booster 2 as a multi-band repeater can avoid the cost of separate signal boosters for each specific frequency band and/or wireless carrier. Additionally, configuring the signal booster 2 as a multi-band repeater can also ease installation, reduce cabling, and/or issues associated with combining multiple repeaters.

The plurality of mobile devices 3a-3c can represent a wide range of mobile or portable communication devices, including, for example, multi-band mobile phones. The network device 4 can represent a wide range of other devices configured to communicate over one or more mobile networks, including, for example, computers, televisions, modems, routers, or other electronics. In one embodiment, the network device 4 is another signal booster. Although FIG. 1 illustrates the signal booster 2 as communicating with three mobile devices 3a-3c and one network device 4, the signal booster 2 can be used to communicate with more or fewer mobile devices and/or more or fewer network devices.

Figure 2A:
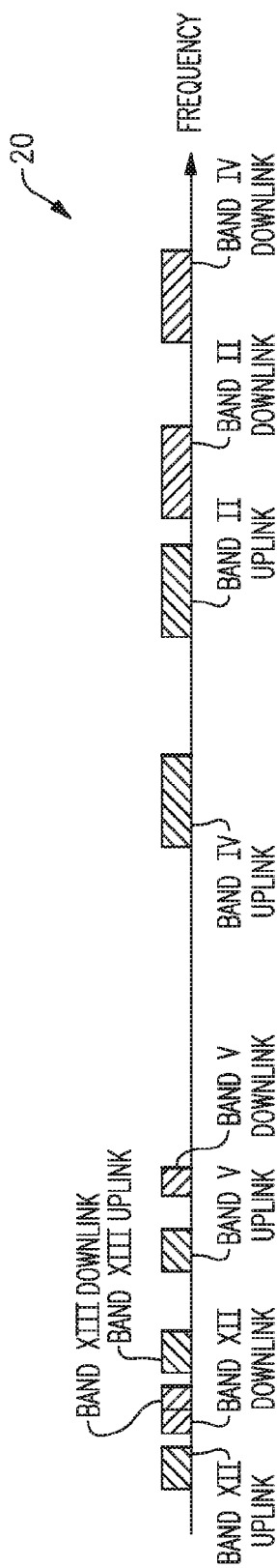
FIG. 2A is a schematic diagram of one example of a portion of a frequency spectrum.

FIG. 2A is a schematic diagram of one example of a portion of a frequency spectrum 20. The frequency spectrum 20 includes a Band XII uplink channel, a Band XII downlink channel, a Band XIII downlink channel, a Band XIII uplink channel, a Band V uplink channel, a Band V downlink channel, a Band IV uplink channel, a Band II uplink channel, a Band II downlink channel, and a Band IV downlink channel. The frequency spectrum 20 of FIG. 2A illustrates one example of the frequency bands that a signal booster described herein can be used to boost. However, other configurations are possible, such as implementations in which the signal booster amplifies more or fewer frequency bands and/or a different combination of frequency bands.

In certain implementations, the Band XII uplink channel can have a frequency range of about 698 MHz to about 716 MHz, and the Band XII downlink channel can have a frequency range of about 728 MHz to about 746 MHz. Additionally, in certain implementations the Band XIII uplink channel can have a frequency range of about 776 MHz to about 787 MHz, and the Band XIII downlink channel can have a frequency range of about 746 MHz to about 757 MHz. Furthermore, in certain implementations the Band V uplink channel can have a frequency range of about 824 MHz to about 849 MHz, and the Band V downlink channel can have a frequency range of about 869 MHz to about 894 MHz. Additionally, in certain implementations the Band IV uplink channel can have a frequency range of about 1710 MHz to about 1755 MHz, and the Band IV downlink channel can have a frequency range of about 2110 MHz to about 2155 MHz. Furthermore, in certain implementations the Band II uplink channel can have a frequency range of about 1850 MHz to about 1910 MHz, and the Band II downlink channel can have a frequency range of about 1930 MHz to about 1990 MHz.

Although specific frequency ranges have been provided above, persons of ordinary skill in the art will appreciate that the frequencies of the bands can vary by geographical region and/or can change over time based on regulations set by governing agencies such as the Federal Communications Commission (FCC) or the Canadian Radio-television and Telecommunications Commission (CRTC). Additionally, the teachings herein are applicable to configurations in which a signal booster provides amplification to a portion of the sub-bands associated with one or more frequency bands. For example, certain frequency bands, including, for example, the PCS band, can be associated with a plurality of sub-bands, and the teachings herein are applicable to configurations in which the signal booster operates to provide boosting for only some of the sub-bands.

Certain signal boosters can use a separate amplification path for each channel of each frequency band that the signal booster is used to boost or repeat. For example, each amplification path of the signal booster can include a band-pass filter having a passband for passing a particular uplink or downlink channel while attenuating or blocking other frequencies. Configuring the signal booster in this manner can aid in maintaining the booster's compliance with communication standards and/or regulator rules, such as those limiting spurious and/or out-of-band emissions.

The radio frequency spectrum has become increasingly crowded with signals as mobile technologies have advanced and the demand for high speed wireless communication has expanded. For example, there has been an increase in a number and proximity of frequency bands that are being utilized by mobile devices and networks.

The increased crowding of the radio frequency spectrum has constrained the design and development of signal boosters, particular multi-band signal boosters that provide boosting across multiple frequency bands, including, for example, adjacent frequency bands. For example, a band-pass filter used to select a particular uplink or downlink channel for boosting can have a non-ideal passband associated with roll-off near the passband's edges. The filter's roll-off can lead to an increase in undesired spurious and/or out-of-band emissions associated with amplification of signals outside of the particular channel's frequency band. Although a particular uplink or downlink channel may be selected by using a relatively sharp filter such as a cavity filter, such filters can be prohibitive in cost and/or size.

Provided herein are apparatus and methods for RF signal boosters. In certain implementations, a multi-band signal booster is provided for boosting the uplink and downlink channels of at least a first frequency band and a second frequency band. The first and second frequency bands can be closely positioned in frequency, and the first and second frequency bands can include uplink or downlink channels that are adjacent. For example, the duplex of the first and second frequency bands can be reversed such that the order in frequency of the first frequency band's uplink and downlink channels is flipped or reversed relative to the second frequency band's uplink and downlink channels. However, other configurations are possible, such as when two frequency bands have that are disjoint, and the uplink and/or downlink channels of the bands are adjacent.

In certain configurations, the downlink channels of the first and second channels are adjacent, and the signal booster includes a first amplification path for boosting the uplink channel of the first frequency band, a second amplification path for boosting the uplink channel of the second frequency band, and a third amplification path for boosting the downlink channels of the first and second frequency bands. For example, the first amplification path can include a first band-pass filter for passing the first frequency band's uplink channel and for attenuating other frequencies such as the first frequency band's downlink channel, and the second amplification path can include a second band-pass filter for passing the second frequency band's uplink channel and for attenuating other frequencies such as the second frequency band's downlink channel. Additionally, the third amplification path can include a third band-pass filter for passing the downlink channels of the first and second frequency bands and for attenuating other frequencies such as the uplink channels of the first and second frequency bands. Thus, the signal booster can include a shared amplification path that operates to boost or repeat the downlink channels of adjacent frequency bands.

However, in other configurations, the uplink channels of the first and second channels are adjacent, and the signal booster includes a first amplification path for boosting the downlink channel of the first frequency band, a second amplification path for boosting the downlink channel of the second frequency band, and a third amplification path for boosting the uplink channels of the first and second frequency bands.

The signal boosters described herein can be used to boost multiple frequency bands, thereby improving signal strength for devices using different communications technologies and/or wireless carriers. Configuring the signal booster in this manner can avoid the cost of multiple signal boosters, such as having a specific signal booster for each frequency band. Additionally, the signal boosters can have reduced component count and/or size, since band-pass filters, amplifiers, attenuators and/or other circuitry can be shared for at least two channels. Furthermore, the signal boosters herein can be implemented without the cost of filters with relatively sharp passbands, such as cavity filters, which can have a high cost and/or a large area. Thus, the signal boosters herein can be implemented using filters having a relatively low cost and/or a relatively small size, such as surface acoustic wave (SAW) filters and/or ceramic filters.

Figure 2B:
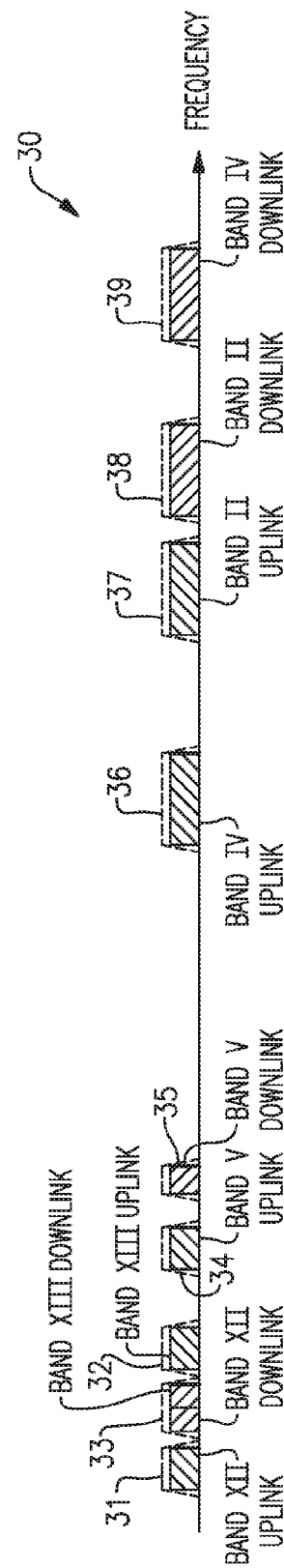
FIG. 2B is schematic diagram of the frequency spectrum of FIG. 2A with annotations showing frequency locations of band-pass filter passbands according to one embodiment.

FIG. 2B is schematic diagram of the frequency spectrum of FIG. 2A with annotations showing frequency locations of band-pass filter passbands according to one embodiment.

In the illustrated configuration, a first band-pass filter passband 31 has been implemented to pass or select a Band XII uplink channel, and a second band-pass filter passband 32 has been implemented to pass a Band XIII uplink channel. Furthermore, a third band-pass filter passband 33 has been implemented to pass both a Band XII downlink channel and a Band XIII downlink channel. Additionally, a fourth band-pass filter passband 34 has been implemented to pass a Band V uplink channel, and a fifth band-pass filter passband 35 has been implemented to pass a Band V downlink channel. Furthermore, a sixth band-pass filter passband 36 has been implemented to pass a Band IV uplink channel, and a seventh band-pass filter passband 37 has been implemented to pass a Band II uplink channel. Additionally, an eighth band-pass filter passband 38 has been implemented to pass a Band II downlink channel, and a ninth band-pass filter passband 39 has been implemented to pass a Band IV downlink channel. Although FIG. 2B illustrates a single passband for each frequency channel, a signal booster can include a plurality of band-pass filters that are cascaded, with or without intervening circuitry, to achieve an overall channel filtering.

As used herein, a band-pass filter can "pass" a particular frequency channel when the frequency channel is substantially within the band-pass filter's passband, even when the passband provides gain or loss in the passband. Accordingly, the teachings herein are not limited to band-pass filters having unity-gain passbands. Furthermore, in certain implementations, a band-pass filter herein can be implemented by cascading a low-pass filter and a high-pass filter. For example, cascading a high-pass filter having a cutoff frequency of $f_1$ and a low-pass filter having a cutoff frequency of $f_2$, where $f_2$ is greater than $f_1$, can operate to provide a band-pass filter having a passband between about $f_1$ and about $f_2$.

As shown in FIG. 2B, the third band-pass filter passband 33 advantageously passes the downlink channels of both Band XII and Band XIII, which are adjacent frequency bands. The illustrated configuration takes advantage of the reverse duplex of the Band XIII frequency band relative to that of the Band XII frequency band. For example, a typical frequency band such as Band XIII, Band II, Band IV, and Band V uses an uplink channel that is at a lower frequency than a corresponding downlink channel of the same band. However, Band XIII uses a reverse configuration in which the downlink channel is at a lower frequency relative to the uplink channel. Configuring a signal booster to have a band-pass filter that passes both the Band XII and Band XIII downlink signals can avoid a need for sharp band-pass filters for separately filtering the downlink bands, which can be difficult using relative small and/or low-cost filters such as SAW filters and/or ceramic filters, which can have a non-ideal passband and can provide insufficient channel filtering or selectivity.

Figure 3:
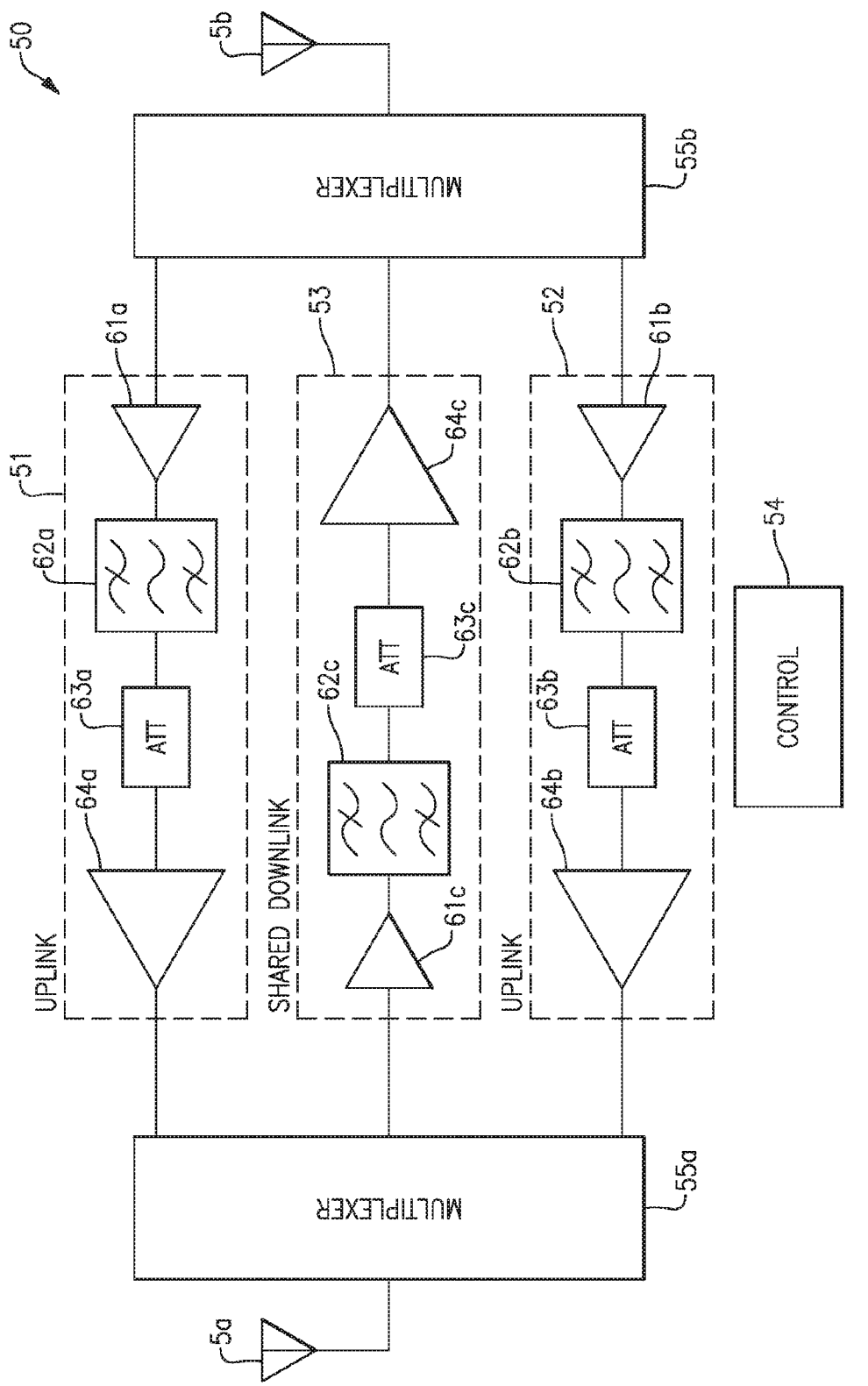
FIG. 3 is a schematic diagram of a signal booster for uplink and downlink channels for two bands according to one embodiment.

FIG. 3 is a schematic diagram of a signal booster 50 for uplink and downlink channels for two bands according to one embodiment. The signal booster 50 includes first and second multiplexers 55a, 55b, first to third amplification paths or circuits 51-53, and a control circuit 54. In the illustrated configuration, the signal booster 50 is electrically coupled to the first and second antennas 5a, 5b, such as by cables or wires. However, other configurations are possible, including, for example, configurations in which the antennas are integrated with a signal booster.

The first multiplexer 55a includes a first terminal electrically connected to an output of the first amplification path 51, a second terminal electrically connected to an output of the second amplification path 52, a third terminal electrically connected to an input of the third amplification path 53, and an antenna terminal electrically connected to the first antenna 5a. The second multiplexer 55b includes a first terminal electrically connected to an input of the first amplification path 51, a second terminal electrically connected to an input of the second amplification path 52, a third terminal electrically connected to an output of the third amplification path 53, and an antenna terminal electrically connected to the second antenna 5b.

The first amplification path 51 includes a first low noise amplifier (LNA) 61a, a first band-pass filter 62a, a first attenuator 63a, and a first power amplifier (PA) 64a. The first LNA 61a, the first band-pass filter 62a, the first attenuator 63a, and the first PA 64a are cascaded with an input of the first LNA 61a operating as the first amplification path's input and with an output of the first PA 64a operating as the first amplification path's output. The second amplification path 52 includes a second LNA 61b, a second band-pass filter 62b, a second attenuator 63b, and a second PA 64b. The second LNA 61b, the second band-pass filter 62b, the second attenuator 63b, and the second PA 64b are cascaded with an input of the second LNA 61b operating as the second amplification path's input and with an output of the second PA 64b operating as the second amplification path's output. The third amplification path 53 includes a third LNA 61c, a third band-pass filter 62c, a third attenuator 63c, and a third PA 64c. The third LNA 61c, the third band-pass filter 62c, the third attenuator 63c, and the third PA 64c are cascaded with an input of the third LNA 61c operating as the third amplification path's input and with an output of the third PA 64c operating as the third amplification path's output.

In one embodiment, the gain of each of the first to third amplification paths 51-53 is selected to be in the range of about 10 dB to about 90 dB. In certain configurations, the gain of one or more of the first to third amplification paths 51-53 can be externally controlled, such as by using one or more switches and/or by using digital configuration. Although one example of gain values has been provided, other configurations are possible.

The first to third LNAs 61a-61c can provide low noise amplification for the first to third amplification paths 51-53, respectively. In certain implementations, the first to third LNAs 61a-61c can be used to amplify signals having a relatively small amplitude while adding or introducing a relatively small amount of noise. For example, in one embodiment, each of the LNAs 61a-61c has a noise figure of 1 dB or less. However, other configurations are possible.

The first to third band-pass filters 62a-62c include inputs electrically coupled to outputs of the first to third LNAs 61a-61c, respectively. The first to third band-pass filters 62a-62c can filter the frequency content of the amplified signals generated by the first to third LNAs 61a-61c, respectively. In certain embodiments, the first to third band-pass filters 62a-62c can be analog filters with fixed filtering characteristics and/or low costs, such as ceramic or SAW filters. However, other configurations are possible. Additional details of the first to third band-pass filters 62a-62c will be described further below.

The first to third attenuators 63a-63c can be used to attenuate the filtered signals generated by the first to third band-pass filters 62a-62c, respectively. The first to third attenuators 63a-63c can be used to limit a gain of the first to third amplification paths 51-53, respectively. For example, it can be desirable to provide attenuation in one or more of the first to third amplification paths 51-53, such as in configurations in which one or more of the input signals to the amplification paths has a relatively large amplitude, which can occur when the signal booster 50 is positioned relatively close to a base station. In one embodiment, the attenuation of the first to third attenuators 63a-63c can be controlled using one or more processing or control units. For example, one or more embedded CPUs can be used to provide gain control, such as programmable gain control. In certain implementations, the first to third attenuators 63a-63c can be implemented using analog attenuation components. However, other configurations are possible, such as implementations using digital attenuators, such as digital step attenuators.

The first to third PAs 64a-64c can be used to amplify the attenuated signals generated by the first to third attenuators 63a-63c, respectively. The first to third PAs 64a-64c can be used to generate amplified RF output signals that have a magnitude suitable for transmission via an antenna. The first to third PAs 64a-64c can be implemented using single or multi-stage configurations, including, for example, multi-stage configurations using automatic gain control (AGC).

The control circuit 54 can be used to control the operation of the circuitry of the signal booster 50. For example, in certain implementations, the control circuit 54 can be used to control the level of attenuation of the first to third attenuators 63a-63c, an amount of gain of the first to third PAs 64a-64c and/or the first to third LNAs 61a-61c, and/or to provide other control operations in signal booster 50. For clarity of the figures, connections and control signals generated by the control circuit 54 have been omitted. Additionally, although not illustrated in FIG. 3, the signal booster 50 can include additional circuitry such as directional couplers, which can aid the control circuit 54 in controlling output power levels of the first to third amplification paths 51-53. Accordingly, in certain implementations the control circuit 54 can operate to provide automatic gain control (AGC). The control circuit 54 can also operate to provide other functionality, including, for example, automatic oscillation detection and/or automatic shutdown to prevent interference with base stations.

The first and second multiplexers 55a, 55b can be used to provide multiplexing between the first to third amplification paths 51-53 and the first and second antennas 5a, 5b, respectively. For example, the first multiplexer 55a can be used to combine the amplified output signals from the first and second amplification paths 51, 52 for transmission via the first antenna 5a, and to filter a receive signal received on the first antenna 5a to provide an input signal to the third amplification path 53. Additionally, the second multiplexer 55b can be used to provide the amplified output signal from the third amplification path 53 to the second antenna 5b, and to filter a receive signal received on the second antenna 5b to provide appropriate input signals to the first and second amplification paths 51, 52.

In certain implementations, the first multiplexer 55a can include a band-pass filter associated with each of the multiplexer's first to third terminals. Additionally, the second multiplexer 55b can include a band-pass filter associated with each of the multiplexer's first to third terminals. The band-pass filter associated with a particular terminal can be configured to pass frequencies corresponding to those of an associated amplification path that is connected to the terminal. For example, in certain configurations, the band-pass filters of the multiplexers 55a, 55b have a passband similar to that of a corresponding one of the band-pass filters 62a-62c of the amplification paths 51-53. One example of a suitable implementation of the first and second multiplexers 55a, 55b can be similar to that described below with respect to FIG. 5A.

Furthermore, in certain implementations, one or both of the first and second multiplexers 55a, 55b can be omitted. For example, in one embodiment, the signal booster 50 omits the first and second multiplexers 55a, 55b in favor of using a separate antenna at the input and output of each of the amplification paths 51-53.

The signal booster 50 can be used to boost the uplink and downlink channels of first and second frequency bands that are adjacent or closely positioned in frequency, such as when adjacent frequency bands have a duplex that is reversed. For example, in one embodiment, the signal booster 50 is used to boost Band XII and Band XIII, which are adjacent in frequency and have uplink and downlink channels that are flipped or reversed in frequency such that the Band XII downlink channel and the Band XIII downlink channel are positioned between the Band XII uplink channel and the Band XIII uplink channel. For example, the Band XII downlink channel can have a greater frequency than the Band XII uplink channel, and the Band XIII uplink channel can have a greater frequency than the Band XIII downlink channel.

Additionally, the signal booster 50 includes the first and second amplification paths 51, 52, which can be used to amplify the uplink channels of the first and second bands. Furthermore, the signal booster 50 includes the third amplification path 53, which operates as a shared amplification path that boosts both the downlink channel of the first frequency band and the downlink channel of the second frequency band. Thus, in contrast to a conventional signal booster that includes a separate amplification path for each frequency channel that is boosted, the illustrated configuration includes a shared amplification path for amplifying adjacent downlink channels, such as close or abutting downlink channels.

To provide suitable channel filtering, the first band-pass filter 62a can pass the first frequency band's uplink channel and attenuate the first frequency band's downlink channel. Additionally, second band-pass filter 62b can pass the second frequency band's uplink channel and attenuate the second frequency band's downlink channel. Furthermore, the third band-pass filter 62c can pass the downlink channels of both the first and second frequency bands and attenuate the uplink channels of both the first and second frequency bands. Thus, the third amplification path 53 is shared between the downlink channels of the first and second frequency bands and operates to simultaneously boost or repeat the downlink channels. Since the third amplification path 53 boosts the downlink channels of both the first and second frequency bands, relatively sharp filters need not be used to separately filter these channels. Thus, the first to third band-pass filters 62a-62c can be implemented using filters having a relatively low cost and/or a relatively small size, such as surface acoustic wave (SAW) and/or ceramic filters.

Although the signal booster 50 has been described in the context of a single amplification path boosting multiple downlink channels, the teachings herein are applicable to configurations in which a single amplification path is used to boost multiple uplink channels. For example, the teachings herein are applicable to configurations in which a shared amplification path is used to boost the uplink channels of two frequency bands that are adjacent, such as when the duplex of the first and second frequency bands is reversed such that the bands' uplink channels are positioned between the bands' downlink channels.

In one embodiment, the adjacent uplink channels or the adjacent downlink channels of the first and second frequency bands are separated in frequency by less than about 10 MHz. Furthermore, in certain implementations, the adjacent uplink channels or the adjacent downlink channels of the first and second frequency bands are abutting, such that there is substantially no separation or gap (e.g., about 0 MHz) between the channel frequencies.

Although one implementation of a signal booster is illustrated in FIG. 3, other configurations are possible. For example, the signal booster can include more or fewer amplifications paths. Additionally, one or more of the amplification paths can be modified to include more or fewer components and/or a different arrangement of components. For example, in certain implementations, the order of a band-pass filter and an attenuator can be reversed in a cascade, the band-pass filters can be positioned before the LNAs in one or more of the cascades, and/or additional components can be inserted in the cascade.

Figure 4:
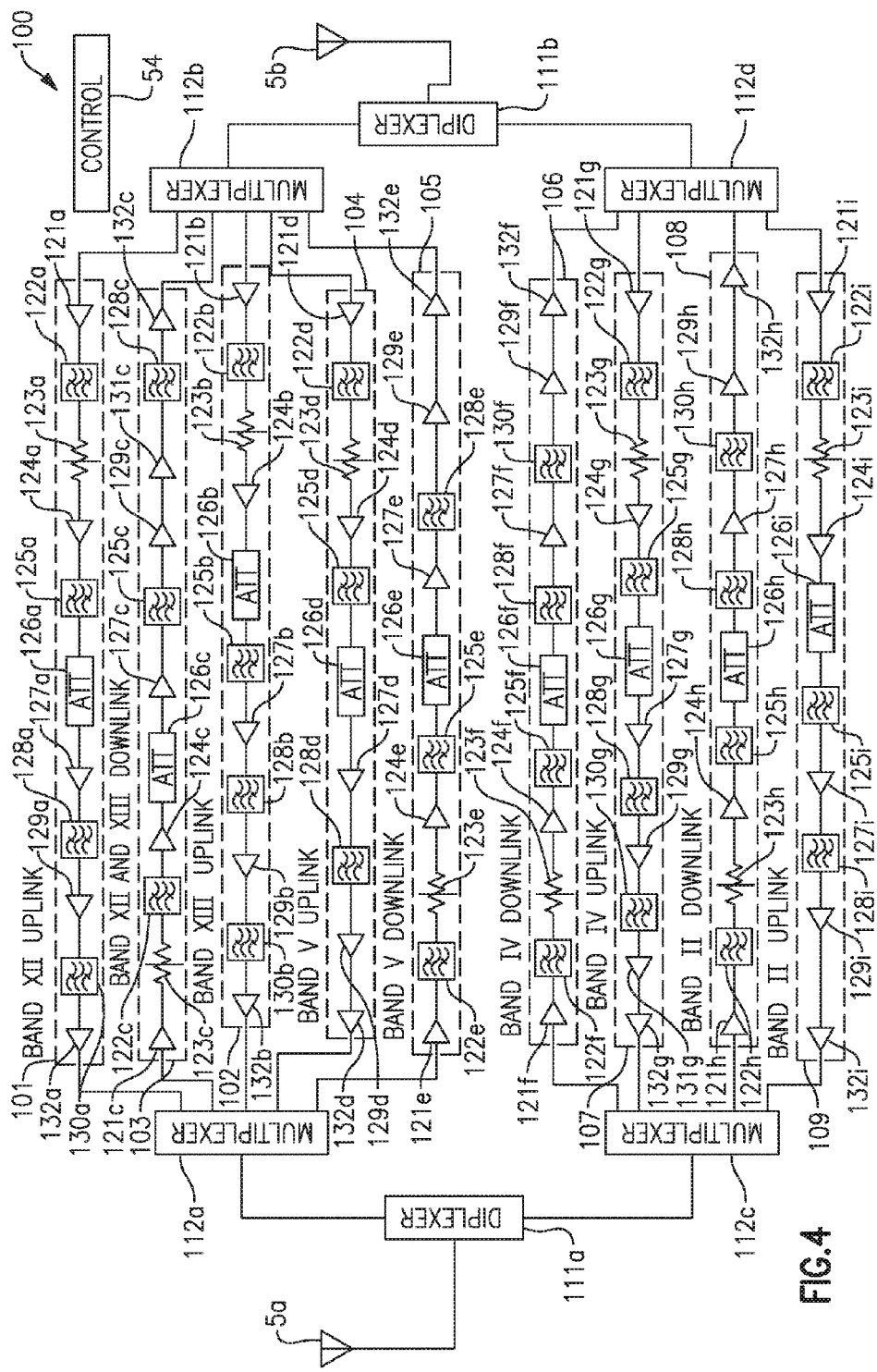
FIG. 4 is a schematic diagram of a signal booster for uplink and downlink channels for five bands according to another embodiment.

FIG. 4 is a schematic diagram of a signal booster 100 for uplink and downlink channels for five bands according to another embodiment. The signal booster 100 includes the control circuit 54, first to fourth multiplexers 112a-112d, first and second diplexers 111a, 111b, and first to ninth amplification paths or circuits 101-109. The signal booster 100 is electrically coupled to the first and second antennas 5a, 5b.

The first diplexer 111a includes an antenna terminal electrically connected to the first antenna 5a, a first terminal electrically connected to an antenna terminal of the first multiplexer 112a, and a second terminal electrically connected to an antenna terminal of the third multiplexer 112c. The second diplexer 111b includes an antenna terminal electrically connected to the second antenna 5b, a first terminal electrically connected to an antenna terminal of the second multiplexer 112b, and a second terminal electrically connected to an antenna terminal of the fourth multiplexer 112d.

The first multiplexer 112a further includes a first terminal electrically connected to an output of the first amplification path 101, a second terminal electrically connected to an output of the second amplification path 102, a third terminal electrically connected to an input of the third amplification path 103, a fourth terminal electrically connected to an output of the fourth amplification path 104, and a fifth terminal electrically connected to an input of the fifth amplification path 105. The second multiplexer 112b further includes a first terminal electrically connected to an input of the first amplification path 101, a second terminal electrically connected to an input of the second amplification path 102, a third terminal electrically connected to an output of the third amplification path 103, a fourth terminal electrically connected to an input of the fourth amplification path 104, and a fifth terminal electrically connected to an output of the fifth amplification path 105.

The third multiplexer 112c includes a first terminal electrically connected to an input of the sixth amplification path 106, a second terminal electrically connected to an output of the seventh amplification path 107, a third terminal electrically connected to an input of the eighth amplification path 108, and a fourth terminal electrically connected to an output of the ninth amplification path 109. The fourth multiplexer 112d includes a first terminal electrically connected to an output of the sixth amplification path 106, a second terminal electrically connected to an input of the seventh amplification path 107, a third terminal electrically connected to an output of the eighth amplification path 108, and a fourth terminal electrically connected to an input of the ninth amplification path 109.

In the illustrated configuration, the first amplification path 101 can provide boosting to a Band XII uplink channel, and the second amplification path 102 can provide boosting to a Band XIII uplink channel. Furthermore, the third amplification path 103 can provide boosting to both the Band XII and Band XIII downlink channels. Additionally, the fourth amplification path 104 can provide boosting to the Band V uplink channel, and the fifth amplification path 105 can provide boosting to the Band V downlink channel. Furthermore, the sixth amplification path 106 can provide boosting to the Band IV downlink channel, and the seventh amplification path 107 can provide boosting to the Band IV uplink channel. Additionally, the eighth amplification path 108 can provide boosting to the Band II downlink channel, and the ninth amplification path 109 can provide boosting to the Band II uplink channel.

The first and second multiplexers 112a, 112b can provide multiplexing operations for the first to fifth amplification paths 101-105. The first and second multiplexers 112a, 112b can include a band-pass filter for each of the multiplexers' first to fifth terminals. The band-pass filters can have passbands positioned at frequencies corresponding to the uplink or downlink channels of an associated amplification path. Additionally, the third and fourth multiplexers 112c, 112d can provide multiplexing operations for the sixth to ninth amplification paths 106-109. The third and fourth multiplexers 112c, 112d can include a band-pass filter for each of the multiplexers' first to fourth terminals. The band-pass filters can have passbands positioned at frequencies corresponding to the uplink or downlink channels of an associated amplification path.

The first diplexer 111a can be used to combine/split signals from/to the antenna terminals of the first and third multiplexers 112a, 112c, and can provide the combined signal to the first antenna 5a. Additionally, the second diplexer 111b can be used to combine/split signals on the antenna terminals of the second and fourth multiplexers 112b, 112d, and can provide the combined signal to the second antenna 5b. Including the first and second diplexers 111a, 111b in the signal booster 100 can aid the signal booster 100 in operating over disjoint frequency bands by combining signals separated by a relatively large frequency difference. For example, in the illustrated configuration, the first and second diplexers 111a, 111b have been used in combination with the multiplexers 112a-112d to multiplex Band XII, Band XIII, and Band V signals with Band II and Band IV signals.

The first to ninth amplification paths 101-109 include different combinations of components, such as amplifiers, attenuators, and band-pass filters, selected to achieve an overall amplification characteristic desirable for a particular band.

In the illustrated configuration, the first amplification path 101 includes a cascade of an LNA 121a, a first band-pass filter 122a, a power level control block or circuit 123a, a first intermediate amplifier or gain block 124a, a second band-pass filter 125a, an attenuator 126a, a second gain block 127a, a third band-pass filter 128a, a third gain block 129a, a fourth band-pass filter 130a, and a power amplifier 132a. Additionally, the second amplification path 102 includes a cascade of an LNA 121b, a first band-pass filter 122b, a power level control block 123b, a first gain block 124b, an attenuator 126b, a second band-pass filter 125b, a second gain block 127b, a third band-pass filter 128b, a third gain block 129b, a fourth band-pass filter 130b, and a power amplifier 132b. Furthermore, the third amplification path 103 includes a cascade of an LNA 121c, a power level control block 123c, a first band-pass filter 122c, a first gain block 124c, an attenuator 126c, a second gain block 127c, a second band-pass filter 125c, a third gain block 129c, a fourth gain block 131c, a third band-pass filter 128c, and a power amplifier 132c. Additionally, the fourth amplification path 104 includes a cascade of an LNA 121d, a first band-pass filter 122d, a power level control block 123d, a first gain block 124d, a second band-pass filter 125d, an attenuator 126d, a second gain block 127d, a third band-pass filter 128d, a third gain block 129d, and a power amplifier 132d. Furthermore, the fifth amplification path 105 includes a cascade of an LNA 121e, a first band-pass filter 122e, a power level control block 123e, a first gain block 124e, a second band-pass filter 125e, an attenuator 126e, a second gain block 127e, a third band-pass filter 128e, a third gain block 129e, and a power amplifier 132e.

Additionally, in the illustrated configuration, the sixth amplification path 106 includes a cascade of an LNA 121f, a first band-pass filter 122f, a power level control block 123f, a first gain block 124f, a second band-pass filter 125f, an attenuator 126f, a third band-pass filter 128f, a second gain block 127f, a fourth band-pass filter 130f, a third gain block 129d, and a power amplifier 132f. Furthermore, the seventh amplification path 107 includes a cascade of an LNA 121g, a first band-pass filter 122g, a power level control block 123g, a first gain block 124g, a second band-pass filter 125g, an attenuator 126g, a second gain block 127g, a third band-pass filter 128g, a third gain block 129g, a fourth band-pass filter 130g, a fourth gain block 131g, and a power amplifier 132g. Additionally, the eighth amplification path 108 includes a cascade of an LNA 121h, a first band-pass filter 122h, a power level control block 123h, a first gain block 124h, a second band-pass filter 125h, an attenuator 126h, a third band-pass filter 128h, a second gain block 127h, a fourth band-pass filter 130h, a third gain block 129h, and a power amplifier 132h. Furthermore, the ninth amplification path 109 includes a cascade of an LNA 121i, a first band-pass filter 122i, a power level control block 123i, a first gain block 124i, an attenuator 126i, a second band-pass filter 125i, a second gain block 127i, a third band-pass filter 128i, a third gain block 129i, and a power amplifier 132i.

The signal booster 100 of FIG. 4 is similar to the signal booster 50 of FIG. 3, except that the signal booster 100 of FIG. 4 has been expanded to provide boosting to five frequency bands and has been adapted to include additional filters, amplifiers and other circuitry, such as additional components in cascades associated with the amplification paths. In the illustrated configuration, each of the amplification paths 101-109 includes an LNA, a power amplifier, an attenuator, and at least one band-pass filter. Additionally, as shown in FIG. 4, the connection between the amplifications paths 101-109 and the antennas 5a, 5b through the multiplexers 112a-112d and the diplexers 111a, 111b can be symmetric. For example, in the illustrated configuration, each of the amplification paths 101-109 is coupled to the antennas 5a, 5b through one multiplexer and one diplexer. Configuring the signal booster 100 in this manner can provide balance between the amplification paths, which can reduce overall noise. Although configuring the signal booster 100 to be symmetric can reduce noise, other implementations are possible, including, for example, asymmetric configurations.

As shown in FIG. 4, a type, number, and/or order of the components in an amplification path can be selected to provide a desired amplification characteristic for a particular frequency channel. For example, a number of gain blocks can be selected to achieve a desired amplification characteristic depending upon the band and channel(s) being amplified, while a number of pass-band filters can be selected to achieve a desired filtering characteristic for the channel(s).

In certain configurations, the power level control blocks 123a-123i are included to adjust the gain of the first to ninth amplification paths 101-109, respectively. For example, in certain implementations, the power level control blocks 123a-123i can be used to adjust or limit the gain when the gain of an associated amplification path exceeds a maximum power threshold level. However, in other configurations, one or more of the power level control blocks 123a-123i can be omitted.

In the illustrated configuration, the signal booster 100 includes the third amplification path 103, which has been configured to boost both a Band XII downlink channel and a Band XIII downlink channel. The third amplification path 103 includes first to third band-pass filters 122c, 125c, 128c, each of which can have a passband configured to pass both the Band XII and Band XIII downlink channels while attenuating other frequency components. Thus, in contrast to the signal booster 50 of FIG. 3 which includes one band-bass filter 62b in the third amplification path 53, the signal booster 100 illustrates a configuration using three band-pass filters 122c, 125c, 128c in the third amplification path 103. Using a plurality of band-pass filters in an amplification path can increase a strength or degree of filtering. For example, cascading multiple band-pass filters can be useful in high gain configurations, in which an amplification path has a relatively large amount of gain.

Although FIG. 4 illustrates one example of a signal booster in accordance with the teachings herein, other configurations are possible. For example, the teachings herein are applicable to configurations in which the signal booster 100 boosts more or fewer bands, or a different combination of bands.

FIG. 5A is a schematic diagram of a multiplexer 150 according to one embodiment. The multiplexer 150 includes a first terminal 151, a second terminal 152, a third terminal 153, an antenna terminal 156, a combiner 159, a first band-pass filter 161, a second band-pass filter 162, and a third band-pass filter 163. The first band-pass filter 161 is electrically connected between the first terminal 151 and the antenna terminal 156 through the combiner 159. Additionally, the second band-pass filter 162 is electrically connected between the second terminal 152 and the antenna terminal 156 through the combiner 159. Furthermore, the third band-pass filter 163 is electrically connected between the third terminal 153 and the antenna terminal 156 through the combiner 159. The combiner 159 can be used to enhance performance by combining RF signals associated with the band-pass filters 161-163 while helping to control characteristic impedance so as to reduce or prevent signal reflections. However, in certain configurations, the combiner 159 can be omitted.

Although FIG. 5A illustrates the multiplexer 150 as including certain terminals and components, the multiplexer 150 can be adapted to include additional structures, such as additional components cascaded with the band-pass filters 161-163 and/or additional terminals associated with other frequency channels. In certain embodiments, the first to third band-pass filters 161-163 can be analog filters with fixed filtering characteristics and/or low cost, such as ceramic or SAW filters. However, other configurations are possible.

In one embodiment, the multiplexer 150 is used in a signal booster that boosts at least the uplink and downlink channels of first and second frequency bands, which have downlink channels that are adjacent, such as when the first and second frequency bands are duplex reversed such that the bands' downlink channels are positioned between the bands' uplink channels. Additionally, the first band-pass filter 161 can pass an uplink channel of the first frequency band and can attenuate the downlink channel of the first frequency band. Furthermore, the second band-pass filter 162 can pass an uplink channel of the second frequency band and can attenuate the downlink channel of the second frequency band. Furthermore, the third band-pass filter 163 can pass the downlink channels of both the first and second frequency bands and can attenuate the uplink channels of both the first and second frequency bands. Additional details of the multiplexer 150 can be similar to those described earlier.

Although one embodiment of a multiplexer has been described, other configurations are possible. For example, the teachings herein are applicable to multiplexer configurations used in a signal booster that boosts at least the uplink and downlink channels of first and second frequency bands, which are duplex reversed such that the bands' uplink channels are positioned between the bands' downlink channels. In such a configuration, the third band-pass filter 163 can pass the uplink channels of both the first and second frequency bands and can attenuate the downlink channels of both the first and second frequency bands.

FIG. 5B is a schematic diagram of a multiplexer 170 according to one embodiment. The multiplexer 170 includes a first terminal 151, a second terminal 152, a third terminal 153, a fourth terminal 154, a fifth terminal 155, an antenna terminal 156, a combiner 159, a first band-pass filter 161, a second band-pass filter 162, a third band-pass filter 163, a fourth band-pass filter 164, and a fifth band-pass filter 165.

The multiplexer 170 of FIG. 5B is similar to the multiplexer 150 of FIG. 5A, except that the multiplexer 170 further includes the fourth and fifth terminals 154, 155 and the fourth and fifth band-pass filters 164, 165. In one embodiment, the fourth terminal 154 and the fifth terminal 155 are configured to operate over an uplink channel of a third frequency band and a downlink channel of the third frequency band, respectively. Additionally, the fourth band-pass filter 164 can pass the uplink channel of the third frequency band while attenuating other frequency components. Furthermore, the fifth band-pass filter 165 can pass the downlink channel of the third frequency and while attenuating other frequency components.

Although two example multiplexer configurations are shown in FIGS. 5A and 5B, the teachings herein are applicable to other configurations, including, for example, multiplexers including additional terminals and/or components. Accordingly, the teachings herein are not only applicable to multiplexers that multiplex two or three frequency bands, but also to other configurations, such as multiplexers that multiplex four or more bands. Additionally, the teachings herein are also applicable to multi-stage multiplexers including a plurality of multiplexer stages and/or configurations using multiple stages of filtering, including low-pass, high-pass and/or band-pass filtering. Furthermore, the multiplexer 150 of FIG. 5A and/or the multiplexer 170 of FIG. 5B can be used in a variety of signal boosters, and are not just limited for use in the signal boosters shown in FIGS. 3 and 4. For example, since the multiplexer 50 and the multiplexer 70 provide band-pass filtering, the multiplexers of FIGS. 5A and 5B can be used in configurations of signal boosters that do not include any band-pass filters in the signal booster's amplification paths, or in configurations in which only some of the signal booster's amplification paths include band-pass filters.

FIGS. 6A-6D illustrate various views of a signal booster 200 according to one embodiment. The signal booster 200 includes a housing 201, first and second antenna ports 203a, 203b, top and bottom covers 207, 208, a first printed circuit board (PCB) 211, and a second PCB 212.

Figure 6B:
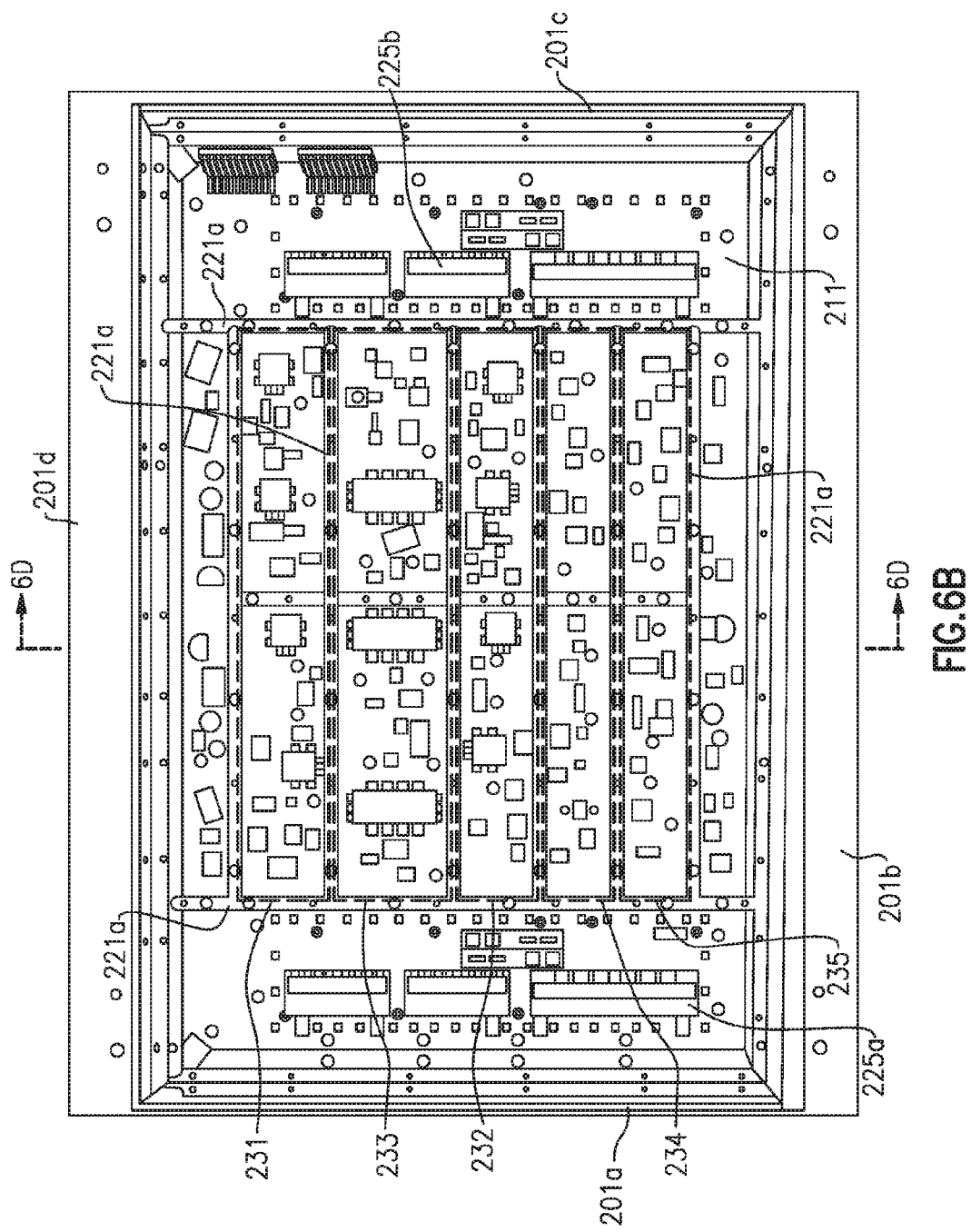
FIG. 6B is a top plan view of the signal booster of FIG. 6A with a top cover removed and with a first metal layer removed.
Figure 6C:
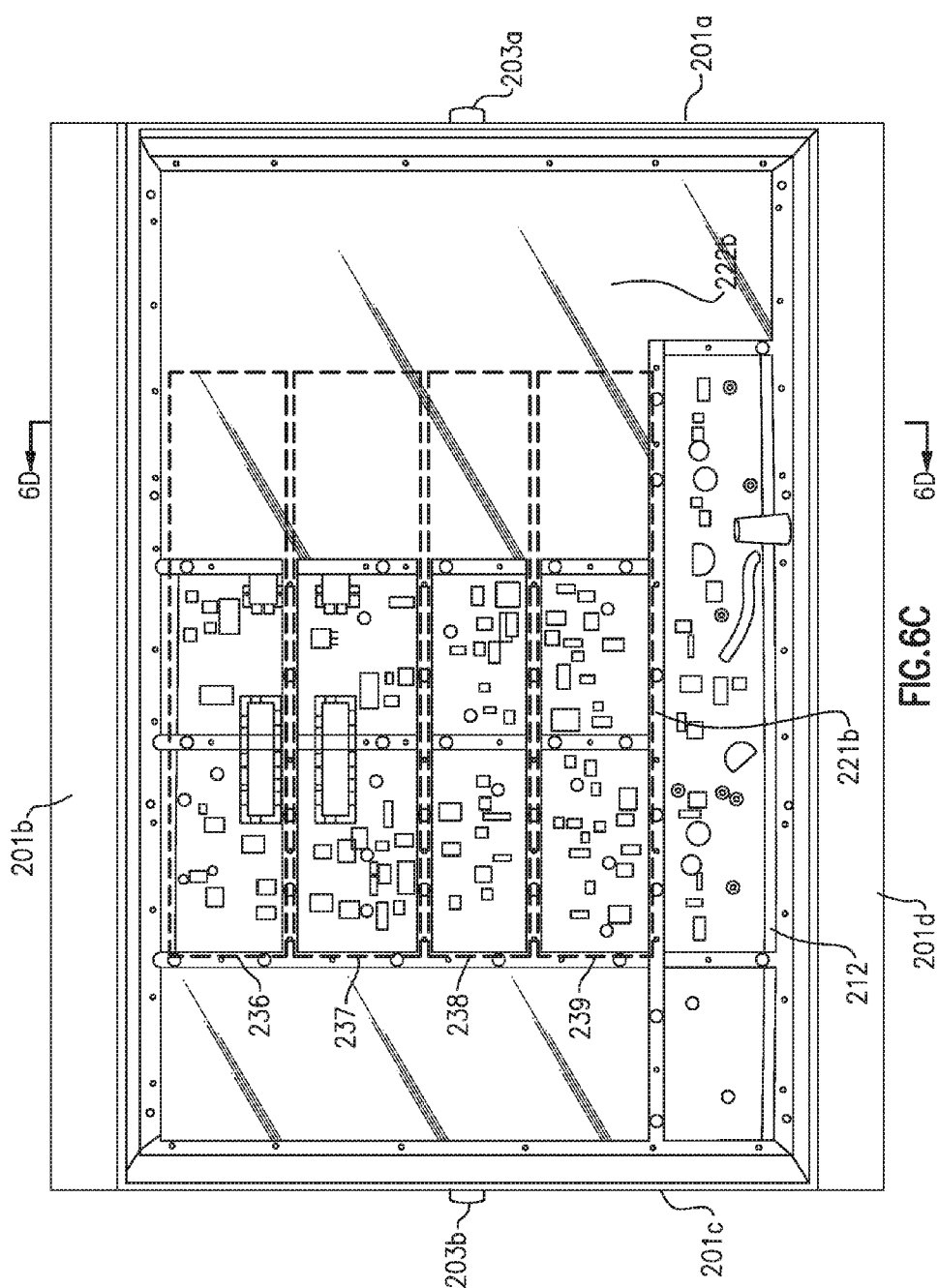
FIG. 6C is a bottom plan view of the signal booster of FIG. 6A with a bottom cover removed and with a portion of a second metal layer removed.
Figure 6D:
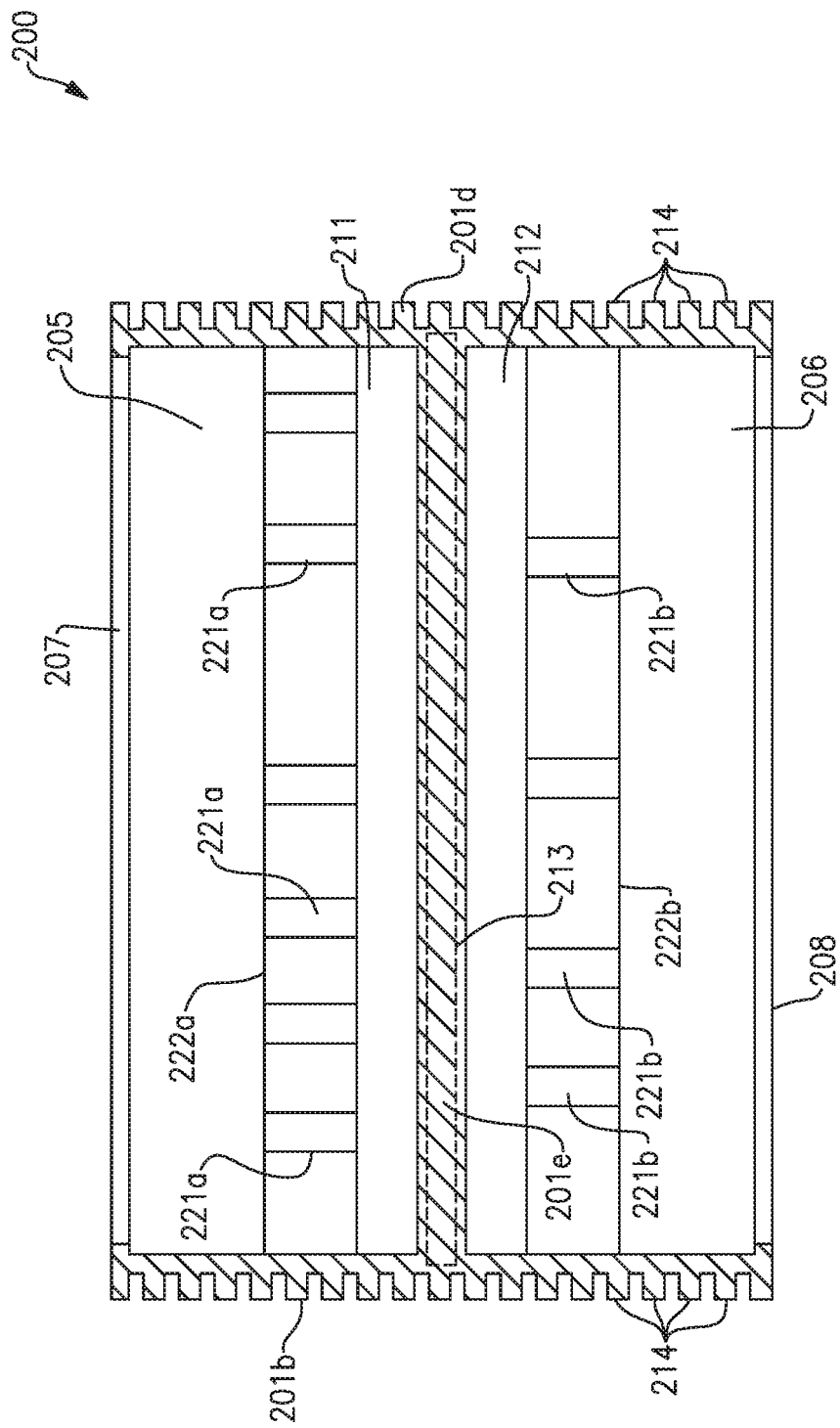
FIG. 6D is a cross-section of the signal booster of FIGS. 6A-6C taken along the lines 6D-6D.

FIG. 6A is a perspective view of a signal booster 200. FIG. 6B is a top plan view of the signal booster 200 of FIG. 6A with the top cover 207 removed and with the first metal layer 222a removed. FIG. 6C is a bottom plan view of the signal booster 200 of FIG. 6A with the bottom cover 207b removed and with a portion of the second metal layer 222b removed. FIG. 6D is a cross-section of the signal booster 200 of FIGS. 6A-6C taken along the lines 6D-6D.

The housing 201 of the signal booster 200 can be used to house the first and second PCBs 211, 212 and/or other circuitry or components of the signal booster 200. The housing 201 can have a variety of form factors. In the illustrated configuration, the housing 201 includes a first side portion 201a, a second side portion 201b, a third side portion 201c, a fourth side portion 201d, and a shielding or middle portion 201e. In the configuration shown in FIGS. 6A-6D, the first to fourth side portions 201a-201d operate as walls of the signal booster 200, and can have a rectangular perimeter when viewed from above or below. However, other configurations are possible. As shown in FIG. 6D, the shielding portion 201e can extend in a plane substantially perpendicular to the first to fourth side portions 201a-201d, and can contact each of the first to fourth sides 201a-201d. The signal booster 200 can include an upper cavity 205 over the shielding portion 201e and bounded by the first to fourth sides 201a-201d, the shielding portion 201e, and the top cover 207. Additionally, the signal booster 200 can include a lower cavity 206 beneath the shielding portion 201e and bounded by the first to fourth sides 201a-201d, the shielding portion 201e, and the bottom cover 208. The housing 201 can be implemented using a variety of materials, including, for example, metals, such as aluminum. It will be understood that the orientations are relative and the entire signal booster 200 can be placed and held in any desired orientation.

In one embodiment, the housing 201 has a height in the range of about 1 cm to about 10 cm, a width in the range of about 10 cm to about 30 cm, and a length in the range of about 10 cm to about 80 cm. Although one example of dimensional ranges for the housing 201 has been provided, other configurations are possible.

In the illustrated configuration, the first PCB 211 has been positioned in the upper cavity 205, and the second PCB 212 has been positioned in the lower cavity 206. In certain configurations, the first PCB 211 includes circuitry associated with one or more low frequency RF bands, such as RF bands having a frequency less than 1 GHz, and the second PCB 212 includes circuitry associated with one or more high frequency RF bands, such as RF bands having a frequency greater than 1 GHz. For example, in one embodiment, the first PCB 211 includes circuitry for boosting at least one of Band XII, Band XIII, and Band V, and the second PCB 212 includes circuitry for boosting at least one of Band II and Band IV. However, other configurations are possible.

In certain implementations, the first and second PCBs 211, 212 are implemented using different materials suitable for use with the frequency bands for which the circuitry on the PCB provides amplification. For example, in one embodiment, the first PCB 211 is used to amplify one or more low frequency RF bands, such as Band XII, Band XIII, and/or Band V, and is implemented using FR4 board. Additionally, in certain configurations, the second PCB 212 is used to amplify one or more high frequency RF bands, such as Band II and/or Band IV, and is implemented using a laminate board designed for high frequency circuit use. For example, in one embodiment the second PCB 12 is a laminate including a ceramic filled, glass reinforced, hydrocarbon based insulating material, such as that used in the R04000® commercially available from Rogers Corporation of Chandler, Ariz. Although the first and second PCBs 211, 212 can be implemented using different materials, the teachings herein are also applicable to configurations in which the PCBs are implemented using the same materials.

Using the first and second PCBs 211, 212 rather than a single PCB can provide a number of advantages, such as allowing the PCBs to be separately tuned or configured for the particular bands for which the PCB provides amplification. Additionally, using two PCBs can ease manufacturing and/or reduce cost in certain configurations. Although the signal booster 200 of FIGS. 6A-6D is illustrated for a two PCB configuration, the teachings herein are applicable to single PCB configurations or configurations using three or more PCBs.

As shown in FIG. 6D, the middle or shielding portion 201e extends between the first and second PCBs 211, 212. Configuring the signal booster 200 in this manner can aid in providing RF shielding or isolation between circuitry on the first and second PCBs 211, 212. For example, when the top and bottom covers 207, 208 are attached to the housing 201, the first and second PCBs 211, 212 can each operate in a Faraday cage or shield formed in part by the shielding portion 201e. The shielding portion 201e can also aid in providing thermal dissipation for the first and second PCBs 211, 212. In one embodiment, the shielding portion 201e has a thickness in the range of about 1 mm to about 40 mm.

Although the illustrated shielding portion 201e is implemented as a part of the housing 201, the teachings herein are applicable to configurations in which the shielding portion is implemented as a separate structure.

In certain implementations, the shielding portion 201e is implemented using one or more heat pipes, such as the heat pipe 213 of FIG. 6D. The heat pipe 213 can be used to improve the thermal conductivity of the housing 201 by increasing the dissipation of heat generated by circuitry of the first and/or second PCBs 211, 212. In certain implementations, the heat pipe 213 includes one or more phase change materials. As used herein, heat pipe refers not only to a tubular heat pipes, but also to planar heat pipes or heat spreaders.

Furthermore, as shown in FIG. 6D, the first and second PCBs 211, 222 can be configured to contact the shielding portion 201e to increase heat dissipation. In certain implementations, a side of the first PCB 211 contacting the shielding portion 201e and a side of the second PCB 212 contacting the shielding portion can include soldering metal to enhance heat dissipation. Furthermore, in certain implementations, the first and second PCBs 211, 212 can be firmly secured against the shielding portion 201e, such as by using screws or other fasteners. Additionally, in certain configurations a thermal conductor such as thermal grease can also be used to increase contact thus thermal conductivity, thereby helping to further increase heat transfer from the PCBs to the housing 201.

To aid in removing heat, the housing 200 can include one or more fin structures used to dissipate heat. For example, in the illustrated configuration, the second and fourth side portions 201b, 201d have been implemented to include heat fins 214. The heat fins 214 can be used to dissipate heat, including, for example, heat dissipated through the shielding portion 201e. For example, as shown in FIG. 6D, the shielding portion 201e extends substantially parallel to the first and second PCBs 211, 212, which can increase thermal contact. Additionally, the shielding portion 201e contacts the second and fourth sides 201b, 201d, which are substantially perpendicular to the first and second PCBs 211, 212 and include the heat fins 214. It has been found that implementing the heat dissipation structure of the signal booster 200 in this manner can improve overall heat dissipation relative to a configuration in which the shielding portion 201e is omitted and/or in which fins are included only on surfaces that are parallel to the PCBs, such as the top or bottom surfaces of the housing.

Certain structures associated with the first and second PCBs 211, 212 have been labeled in FIGS. 6B-6D. For example, as shown in FIGS. 6B and 6D, the upper cavity 205 includes a first isolation structure 221a, a first metal layer 222a (e.g., a foil), first and second multiplexers 225a, 225b, and first to fifth amplification circuits or paths 231-235. Additionally, as shown in FIGS. 6C and 6D, the lower cavity 206 includes a second isolation structure 221b, a second metal layer 222b (e.g., a foil), and sixth to ninth amplification paths 236-239.

The first to ninth amplification paths 231-239 can be used to provide boosting to different frequency channels. For example, in one embodiment, the first PCB 211 is configured such that the first amplification path 231 boosts a Band XII uplink channel, the second amplification path 232 boosts a Band XIII uplink channel, the third amplification path 233 boosts both a Band XII downlink channel and a Band XIII downlink channel, the fourth amplification path 234 boosts a Band V uplink channel, and the fifth amplification path 235 boosts a Band V downlink channel. Additionally, in certain configurations, the second PCB 212 is configured such that the sixth amplification path 236 boosts a Band IV downlink channel, the seventh amplification path 237 boosts a Band IV uplink channel, the eighth amplification path 238 boosts a Band II downlink channel, and the ninth amplification path 239 boosts a Band II uplink channel. However, other configurations are possible.

As shown in FIGS. 6B-6D, the first and second isolation structures 221a, 221b and the first and second metal layers 222a, 222b can operate to provide shielding between or within the first to ninth amplification paths 231-239. Configuring the signal booster 200 to include the first and second isolation structures 221a, 221b and the first and second metal layers 222a, 222b can improve the performance of the signal booster 200 by, for example, reducing interference and/or feedback paths between amplification stages or paths relative to a configuration in which the first and second isolation structures 221a, 221b and the first and second metal layers 222a, 222b are omitted.

The first and second isolation structures 221a, 221b and the first and second metal layers 222a, 222b can also provide isolation for other components of the signal booster 200, including, for example, the first and second multiplexers 225a, 225b of the first PCB 211 as well as multiplexers of the second PCB 212 (not shown in FIGS. 6A-6D). In certain implementations, first and second isolation structures 221a, 221b and the first and second metal layers 222a, 222b also provide isolation for diplexers, control circuitry, and/or other components of the signal booster 200. In one embodiment, the first and second metal layers 222a, 222b include foil. In certain configurations, the first and second isolation structures 221a, 221b are implemented using metals, such as aluminum, and can be integrated with the housing 201.

In the illustrated configuration, the first and second PCBs 211, 212 have an orientation that is flipped relative to one another. For example, the first to fifth amplification paths 231-235 of the first PCB 211 are positioned on a side of the first PCB 211 that is opposite the second PCB 212, and the sixth to ninth amplification paths 236-239 of the second PCB 212 are positioned on a side of the second PCB 212 that is opposite the first PCB 211. Configuring the first and second PCBs 211, 212 in this manner can aid in reducing RF interference between the first and second PCBs 211, 212 and in increasing thermal dissipation.

Additionally, configuring the first and second PCBs 211, 212 in this manner can increase the distance between heat sources, such as PAs. For example, the illustrated configuration can have improved thermal performance relative to a configuration in which PAs are positioned in close proximity. Furthermore, in certain implementations the PAs of the first PCB 211 and the PAs of the second PCB 212 are positioned so that they are not aligned with one another with respect to the shielding portion 201e, which can further help in keeping the PAs relatively far away from each other.

The first and second antenna ports 203a, 203b can be used to connect the signal boosters 200 to first and second antennas (not illustrated in FIGS. 6A-6D), respectively. For example, in certain implementations, the first antenna port 203a can be connected to an outdoor antenna using a first cable, and the second antenna port 203b can be connected to an indoor antenna using a second cable. However, other configurations are possible, such as configurations having additional antenna ports for additional antennas for each or different frequency bands or to support multiple-input multiple-output (MIMO) antennas.

Although not illustrated in FIGS. 6A-6D, the signal booster 200 can include a variety of other components, including, for example, fasteners, connectors, or adhesives used to assemble the signal booster 200. For example, in one embodiment, the signal booster 200 can include screws for securing the top and bottom covers 207, 208 and/or the first and second PCBs 211, 212 to the housing 201.

Although one example of a signal booster 200 has been described, the teachings herein are applicable to other configurations of signal boosters. For example, the teachings herein are applicable to configurations using a single PCB, and/or to configurations using a housing of a different form factor.

APPLICATIONS

Some of the embodiments described above have provided examples in connection with radio frequency signal boosters. However, the principles and advantages of the embodiments can be used in other suitable systems or apparatus.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not only the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A radio frequency signal booster comprising:
 a printed circuit board (PCB) comprising:
  a shared amplification path configured to provide amplification to at least a portion of a first downlink channel of a first frequency band and to provide amplification to at least a portion of a second downlink channel of a second frequency band, wherein the first frequency band and the second frequency band are different frequency bands,
  wherein the shared amplification path comprises a first band-pass filter configured to pass the at least a portion of the first downlink channel and the at least a portion of the second downlink channel, wherein the shared amplification path is further configured to simultaneously boost both the at least a portion of the first downlink channel and the at least a portion of the second downlink channel, wherein the first downlink channel and the second downlink channel are adjacent in frequency to one another, wherein the shared amplification path further comprises at least one amplifier.

2. The radio frequency signal booster of claim 1, wherein the first band-pass filter is further configured to attenuate both a first uplink channel of the first frequency band and a second uplink channel of the second frequency band.

3. The radio frequency signal booster of claim 1, wherein the first downlink channel of the first frequency band comprises a Band XII downlink channel, and wherein the second downlink channel of the second frequency band comprises a Band XIII downlink channel.

4. The radio frequency signal booster of claim 3,
wherein the first band-pass filter is further configured to pass at least a portion of a Band XII downlink channel having a frequency range of about 728 MHz to about 746 MHz,
wherein the first band-pass filter is further configured to attenuate a Band XII uplink channel having a frequency range of about 698 MHz to about 716 MHz,
wherein the first band-pass filter is further configured to pass at least a portion of a Band XIII downlink channel having a frequency range of about 746 MHz to about 757 MHz,
wherein the first band-pass filter is further configured to attenuate a Band XIII uplink channel having a frequency range of about 776 MHz to about 787 MHz.

5. The radio frequency signal booster of claim 1, wherein the first frequency band comprises a first plurality of sub-bands, wherein the second frequency band comprises a second plurality of sub-bands, wherein the at least a portion of the first downlink channel comprises at least one sub-band of the first plurality of sub-bands, and wherein the at least a portion of the second downlink channel comprises at least one sub-band of the second plurality of sub-bands.

6. The radio frequency signal booster of claim 1, wherein the first downlink channel of the first frequency band and the second downlink channel of the second frequency band are abutting in frequency.

7. The radio frequency signal booster of claim 1, wherein the first band-pass filter comprises one of a surface acoustic wave filter or a ceramic filter.

8. The radio frequency signal booster of claim 1,
wherein the shared amplification path further comprises one or more additional band-pass filters, wherein each of the one or more additional band-pass filters are configured to pass the at least a portion of the first downlink channel and the at least a portion of the second downlink channel.

9. The radio frequency signal booster of claim 1, wherein the at least one amplifier of the shared amplification path comprises a low noise amplifier (LNA).

10. The radio frequency signal booster of claim 1, wherein the at least one amplifier of the shared amplification path comprises a power amplifier (PA).

11. The radio frequency signal booster of claim 1, wherein the at least one amplifier of the shared amplification path comprises a gain block.

12. The radio frequency signal booster of claim 1, wherein the shared amplification path further comprises at least one digital attenuator.

13. The radio frequency signal booster of claim 1, wherein the shared amplification path further comprises at least one analog attenuator.

14. The radio frequency signal booster of claim 1, further comprising a multiplexer comprising the first band-pass filter.

15. The radio frequency signal booster of claim 14, wherein the multiplexer multiplexes two frequency bands.

16. The radio frequency signal booster of claim 1, further comprising a housing and one or more components, wherein the housing houses the PCB and the one or more components.

17. The radio frequency signal booster of claim 1, wherein a gain of the shared amplification path is externally controllable.

18. The radio frequency signal booster of claim 1, wherein the PCB is configured to provide amplification to a plurality of frequency bands, wherein the plurality of frequency bands comprise Band II, Band IV, Band V, Band XII, and Band XIII.

19. An apparatus comprising:
a printed circuit board (PCB) comprising:
a shared amplification path configured to provide amplification to a first downlink channel of a first frequency band and to provide amplification to a second downlink channel of a second frequency band, wherein the first frequency band and the second frequency band are different frequency bands, wherein the shared amplification path is further configured to simultaneously boost both the first downlink channel and the second downlink channel,
wherein the shared amplification path comprises a first band-pass filter configured to pass both the first downlink channel of the first frequency band and the second downlink channel of the second frequency band, and to attenuate both a first uplink channel of the first frequency band and a second uplink channel of the second frequency band,
wherein the first downlink channel and the second downlink channel are adjacent in frequency to one another,
wherein the shared amplification path further comprises at least one amplifier.

20. The apparatus of claim 19, wherein the first downlink channel of the first frequency band comprises a Band XII downlink channel, and wherein the second downlink channel of the second frequency band comprises a Band XIII downlink channel.

21. The apparatus of claim 19, wherein the at least one amplifier of the shared amplification path comprises a LNA.

22. The apparatus of claim 19, wherein the shared amplification path comprises a PA.

23. The apparatus of claim 19, wherein the shared amplification path further comprises at least one attenuator.

24. The apparatus of claim 19, wherein the first downlink channel of the first frequency band and the second downlink channel of the second frequency band are abutting in frequency.

25. The apparatus of claim 19, further comprising a multiplexer comprising the first band-pass filter.

26. The apparatus of claim 25, wherein the multiplexer multiplexes two frequency bands.

27. The apparatus of claim 19, wherein a gain of the shared amplification path is externally controllable.

28. The apparatus of claim 19, wherein the shared amplification path further comprises one or more additional band-pass filters, wherein each of the one or more additional band-pass filters are configured to pass both the first downlink channel of the first frequency band and the second downlink channel of the second frequency band, wherein each of the one or more additional band-pass filters is configured to attenuate both the first uplink channel of the first frequency band and the second uplink channel of the second frequency band.

29. The apparatus of claim 19, wherein the PCB is configured to provide amplification to a plurality of frequency bands, wherein the plurality of frequency bands comprise Band II, Band IV, Band V, Band XII, and Band XIII.

30. A method of boosting radio frequency signals in a signal booster, the method comprising:
providing amplification to a first downlink channel of a first frequency band and to a second downlink channel of a second frequency band using a shared amplification path of the signal booster,
wherein providing amplification comprises simultaneously boosting both the first downlink channel and the second downlink channel using at least one amplifier of the shared amplification path;
passing both the first downlink channel of the first frequency band and the second downlink channel of the second frequency band using a first band-pass filter of the shared amplification path; and
attenuating both a first uplink channel of the first frequency band and a second uplink channel of the second frequency band using the first band-pass filter,
wherein the first downlink channel and the second downlink channel are adjacent in frequency to one another.

* * * * *